Figure 1:
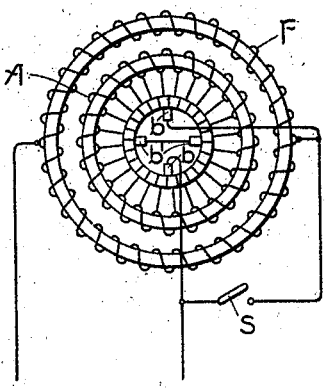

No. 827,319. PATENTED JULY 31, 1906.
M. MILCH.
ALTERNATING CURRENT MOTOR.
APPLICATION FILED JAN. 3, 1905.

Witnesses.

Inventor.
Maurice Milch,
by Albert G. Davis
Atty.

UNITED STATES PATENT OFFICE.

MAURICE MILCH, OF SCHENECTADY, NEW YORK, ASSIGNOR TO GENERAL ELECTRIC COMPANY, A CORPORATION OF NEW YORK.

ALTERNATING-CURRENT MOTOR.

No. 827,319.     Specification of Letters Patent.     Patented July 31, 1906.

Application filed January 3, 1905. Serial No. 239,287.

*To all whom it may concern:*

Be it known that I, MAURICE MILCH, a subject of the Emperor of Austria-Hungary, residing at Schenectady, in the county of Schenectady, State of New York, have invented certain new and useful Improvements in Alternating-Current Motors, of which the following is a specification.

My invention relates to alternating-current motors of the commutator type; and its object is to provide a novel arrangement of circuits and controlling means for such motors, whereby the motor has a large starting torque, but when started operates only in the neighborhood of synchronism.

The ordinary single-phase induction-motor which operates always in the neighborhood of synchronism is not suitable for use in many applications, since it has no starting torque. Alternating-current motors of the commutator type, such as repulsion and series motors, on the other hand, have a large starting torque with a speed-torque characteristic similar to that of the direct-current series motor. They are consequently likely to race on light roads and are not suited for use in certain applications, such as elevator work, where the load may at times be very small.

In two of my former applications, Serial No. 189,121, filed January 15, 1904, and Serial No. 223,838, filed September 9, 1904, I have disclosed an arrangement whereby an alternating-current motor of the commutator type may be started as an ordinary repulsion-motor, and then when it is up to speed a second rotor-circuit may be closed, so as to cause the motor to operate substantially at synchronism. The switch for producing the second short circuit may be either manual or automatic, and in my former applications above referred to I have disclosed two types of automatic switches adapted for this purpose.

My present invention relates to the control of motors in which current is supplied directly to the armature-winding at starting—such, for instance, as the series motor—and it consists in the combination, in an alternating-current motor, of a field-winding, an armature provided with a commutator and brushes, connections for supplying current to the armature-winding on a line at an angle to the field magnetization to start the motor, means for short-circuiting the armature on said line when the motor is up to speed, and connections for short-circuiting the armature in a second line at an angle to the first. The short circuit on the second line may be closed at starting and may be arranged on the line of field magnetization, so as to compensate for the self-induction of the field-winding at starting. When the motor is up to speed and the armature is short-circuited on two lines displaced from each other, it acts as the rotor of a single-phase induction-motor, and the motor operates substantially at synchronism under all loads.

My invention will best be understood by reference to the following drawings, in which—

Figure 2:
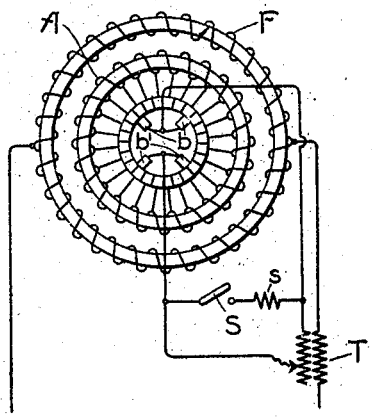

Figure 1 shows diagrammatically a motor provided with a controlling-switch arranged and connected in accordance with my invention, and Fig. 2 shows a modification of the same.

In Fig. 1, F represents the field-winding, which for the sake of simplicity is shown as a Gramme ring. It will be understood, however, that my invention is applicable to a motor having any well-known type of winding on both members. A represents the armature, which is also illustrated as a Gramme ring. The commutator-brushes $b$ $b$, displaced approximately ninety degrees from the line of field magnetization, are connected in series with the field in the usual manner. A second set of brushes $b'$ $b'$ short-circuit the armature-winding on the line of magnetization of the field-winding for the purpose that has been heretofore explained. With these connections the motor starts as a compensated series motor. S represents a switch which when closed short-circuits the commutator-brushes $b$ $b$. Thus when the motor is up to speed and the switch S is closed the armature will be short-circuited on two lines at an angle to each other, and will consequently act as the rotor of an ordinary single-phase induction-motor.

If the motor is designed for operation on a high-voltage circuit, the armature-winding may be connected in series with the field-winding through a transformer instead of directly. Furthermore, other arrangements of the commutator-brushes may be employed, the only requirement being that at the start current is supplied to the armature on a line displaced approximately ninety degrees from the line of field magnetization, while the armature is short-circuited on the line of field magnetization, and when the motor is up to speed a short circuit is established on the line on which current was supplied at the start. Moreover, the armature need not be directly short-circuited, but may have its circuit closed through an impedance or source of compensating electromotive force. Thus in Fig. 2 I have shown the armature connected in series with the field through a transformer T instead of directly, and a different arrangement of brushes is employed from that shown in Fig. 1. Two pairs of brushes $b\ b$ and $b'\ b'$ both short-circuit the armature-winding on the line of magnetization of the field-winding, and since these pairs of brushes are used as the terminals of the armature for supplying current to the armature at starting the same results are obtained as in Fig. 1. The switch S is arranged to short-circuit the two sets of brushes upon each other through the impedance or source of counter electromotive force (indicated by $s$) when the motor is up to speed. At starting the switch S is opened and the starting current and torque may be controlled by varying the ratio of transformation of the series transformer T, as indicated in the drawings. The motor then starts as a compensated series motor. When the motor is up to speed, the switch S is closed, and four points of the armature-winding are then short-circuited on each other. The armature then acts as the rotor of a single-phase induction-motor, and the motor operates at substantially synchronous speed. Instead of the manually-operated switch shown in the drawings any suitable type of automatic switch—such, for instance, as those disclosed in my former applications—may be employed, if desired.

Obviously the motor as described above could be started as a simple series motor and the short circuits on both lines produced when the motor is up to speed; but by leaving the brushes $b'\ b'$ short-circuited at the start the power factor of the motor is improved and the switch connections are simpler. I desire it to be understood, however, that I do not limit myself to a permanent short circuit on the line of field magnetization, but I intend to cover an arrangement of brushes adapted to produce the short circuit whether the connection between the short-circuiting brushes is permanent or not. Accordingly, I do not desire to limit myself to the particular construction and arrangement of parts here shown, but aim in the appended claims to cover all modifications which are within the scope of my invention.

What I claim as new, and desire to secure by Letters Patent of the United States, is—

1. In an alternating-current motor, a field-winding, an armature-winding provided with a commutator and brushes, connections for supplying current to the armature-winding on a line at an angle to the field magnetization to start the motor, means for short-circuiting the armature on said line when the motor is up to speed, and connections for short-circuiting the armature on a second line at an angle to the first.

2. In an alternating-current motor, a field-winding, an armature-winding provided with a commutator and brushes, connections for supplying current to the armature-winding in series with the field on a line at an angle to the field magnetization to start the motor, means for short-circuiting the armature on said line when the motor is up to speed, and connections for short-circuiting the armature on a second line at an angle to the first.

3. In an alternating-current motor, a field-winding, an armature-winding provided with a commutator, brushes arranged to short-circuit the armature on the line of field magnetization, means for supplying current to the armature-winding on a line at an angle to the field magnetization, and means for short-circuiting the armature on the latter line when the motor is up to speed.

4. In an alternating-current motor, a field-winding, an armature-winding provided with a commutator, brushes arranged to short-circuit the armature on the line of field magnetization, means for supplying current to the armature-winding in series with the field on a line at an angle to the field magnetization, and means for short-circuiting the armature on the latter line when the motor is up to speed.

In witness whereof I have hereunto set my hand this 30th day of December, 1904.

MAURICE MILCH.

Witnesses:
 BENJAMIN B. HULL,
 HELEN ORFORD.